US010233965B2

(12) United States Patent
Otaviano Rossato

(10) Patent No.: US 10,233,965 B2
(45) Date of Patent: Mar. 19, 2019

(54) FLEXIBLE TRANSMISSION SYSTEM FOR USE IN AGRICULTURAL MACHINES AND TOOLS IN GENERAL

(71) Applicant: SEMEATO S/A INDUTRIA E COMERCIO, Passo Fundo (BR)

(72) Inventor: Roberto Otaviano Rossato, Passo Fundo (BR)

(73) Assignee: SEMEATO S/A INDUSTRIA E COMERCIO, Passo Fundo (BR)

( * ) Notice: Subject to any disclaimer, the term of this patent is extended or adjusted under 35 U.S.C. 154(b) by 0 days.

(21) Appl. No.: 15/313,925

(22) PCT Filed: Jan. 28, 2015

(86) PCT No.: PCT/BR2015/050006
§ 371 (c)(1),
(2) Date: Dec. 6, 2016

(87) PCT Pub. No.: WO2015/179938
PCT Pub. Date: Dec. 3, 2015

(65) Prior Publication Data
US 2017/0114825 A1 Apr. 27, 2017

(30) Foreign Application Priority Data
May 27, 2014 (BR) .......................... 1020140127178

(51) Int. Cl.
*F16C 1/02* (2006.01)
*F16C 1/10* (2006.01)
(Continued)

(52) U.S. Cl.
CPC .............. *F16C 1/106* (2013.01); *A01C 19/00* (2013.01); *F16C 1/02* (2013.01); *F16H 57/12* (2013.01); *F16C 2310/00* (2013.01)

(58) Field of Classification Search
CPC .. F16C 1/10; F16C 1/101; F16C 1/106; F16C 1/02; F16C 2310/00; A01C 19/00; F16H 2057/02056; F16H 57/02; F16H 57/12
See application file for complete search history.

(56) References Cited

U.S. PATENT DOCUMENTS 4,776,543 A * 10/1988 Stableford .............. B64C 13/30
244/232
5,363,718 A * 11/1994 Ganser ................. B60H 1/0065
74/501.5 R (Continued)

FOREIGN PATENT DOCUMENTS

BR          0001000      1/2001
BR          0302599      8/2004
(Continued)

OTHER PUBLICATIONS

International Search Report for PCT/BR2015/050006, English Translation attached to original, Both completed by the Brazilian Patent Office on Jun. 3, 2015, 7 Pages.

*Primary Examiner* — Adam D Rogers
(74) *Attorney, Agent, or Firm* — Brooks Kushman P.C.

(57) ABSTRACT

A flexible transmission system having a connection element for cables, which transmit rotation from the drive shaft to the dispensers, transmission housings are used. These are arranged in a manner to allow that possible vertical oscillations of the equipment, caused by irregularities in the ground, so not to interfere in the consistency and regularity of the rotation transmission, maintaining the product deposition rate for which the machine was initially regulated, to guarantee its productivity and using, to achieve this, a reduced number of component parts. This facilitates not only the assembly but also the maintenance of the equipment, with direct consequences on its production cost.

1 Claim, 6 Drawing Sheets

(51) Int. Cl.
*F16H 57/12* (2006.01)
*A01C 19/00* (2006.01)

(56) References Cited

U.S. PATENT DOCUMENTS

| | | | | |
|---|---|---|---|---|
| 6,225,581 B1 * | 5/2001 | Gerbert-Gaillard | ...... | F16C 1/10 |
| | | | | 200/50.01 |
| 6,715,433 B1 | 4/2004 | Friestad | | |
| 2013/0276570 A1 | 10/2013 | Bergere | | |

FOREIGN PATENT DOCUMENTS

| | | | | |
|---|---|---|---|---|
| BR | PI 0804442 | 7/2010 | | |
| BR | 102012008960 | 11/2013 | | |
| DE | 202011002760 U1 * | 6/2012 | ............. | E05B 79/20 |
| GB | 684246 A * | 12/1952 | ............. | F16H 1/006 |
| WO | 2014028990 | 2/2014 | | |
| WO | 2014043161 | 3/2014 | | |

* cited by examiner

FLEXIBLE TRANSMISSION SYSTEM FOR USE IN AGRICULTURAL MACHINES AND TOOLS IN GENERAL

CROSS-REFERENCE TO RELATED APPLICATION

This application is the U.S. national phase of PCT Application No. PCT/BR2015/050006 filed on Jan. 28, 2015, which claims priority to BR Patent Application No. BR1020140127178 filed on May 27, 2014, the disclosures of which are incorporated in their entirety by reference herein.

FIELD OF THE APPLICATION

The specifications of the patent refer to a flexible transmission system for application in agricultural machinery and implements in general. More specifically, it drives seed dispensers and has the objective to reduce the number of component parts and also to guarantee full operational performance, even in unlevel ground conditions.

SUMMARY OF THE INVENTION

These objectives are achieved by the use of a transmission using a flexible cable, as a replacement for the chains. The ends of the cables are connected to transmission housings and are operated by worm-gear and gears and driven by the drive shaft of the equipment.

BACKGROUND TO THE TECHNIQUE

The proposed development is already known in the current state of the art from patent document BRPI0804442-2. This concerns a mechanism of compact transmission for application in a row planter for agricultural machinery and implements in general. It is formed by set of 90° geared shafts, which receive their rotation from the transmission drive shaft of the equipment and transfers it, through one or more intermediate shafts, to drive the product dispenser. These are mounted to allow articulated movement between themselves, preventing vertical movements of the pantographic arms from interfering in the final rotation transmitted to the dispenser. However, despite the adequate practical performance obtained by this arrangement, there is a major drawback. It is observed that the rotation transmission for the dispensers uses chains, which, in addition to requiring the use of chain tensioners that result in an increase in the number of component parts used in the assembly, also subject the equipment to occasions when the chains accumulate vegetation and the equipment has to be stopped for its removal.

The development proposed is also already known in the current state of the art from patent document BRPI0001000-6, which refers to a row crop planter. This has a seed dispenser and a chemical dispenser, driven by a flexible shaft, which extends transversely from the drive shaft to the dispensers. It has a first gearbox, coupled to the drive shaft, which transfers rotation to the flexible rotary axis. This extends to the second gearbox, which transfers rotation to the seed dispenser, and extends to the third gearbox, which transfers rotation to the chemical dispenser, were the couplings between the gearboxes and the dispensers are those used in conventional planters. However, despite the adequate practical performance achieved by this arrangement, there is a major drawback. It is observed that the rotation transmission for dispensers can be affected by the vertical oscillations of the equipment, resulting from irregularities in the ground.

GROUNDS OF THE INVENTION

With the intention to overcome the drawbacks arising from the current techniques, the proposed flexible transmission system was developed for application in agricultural machinery and implements in general. The main objective is to reduce the number of component elements involved in its assembly and also to provide a transmission with a constant and regular rotation for dispensers, independent of the surface oscillations from the ground.

The proposed flexible transmission system for application in agricultural machinery and implements in general uses transmission housings, as a connection element between the cables that transmit the rotation from the drive shaft to the product dispensers, described in patent document BR102014005541-0. These are arranged in a manner to allow that possible vertical oscillations of the equipment, caused by irregularities in the ground, do not interfere in the consistency and regularity of the rotation transmission. Therefore, they maintain the product deposition rate for which the machine was initially regulated to guarantee its productivity and using, to achieve this, a reduced number of component parts. This facilitates not only the assembly but also the maintenance of the equipment, with direct consequences on its production cost.

BRIEF DESCRIPTION OF DRAWINGS

For a better understanding of the proposed flexible transmission system for application in agricultural machinery and implements in general, reference is made to the attached figures, in order that it can be fully reproduced by the appropriate technique, allowing the full characterization of its operation. The figures are merely illustrative and can therefore vary, as long as they remain with the proposed operational principle, and where.

PREFERRED DESCRIPTION OF THE INVENTION

Figure 1:
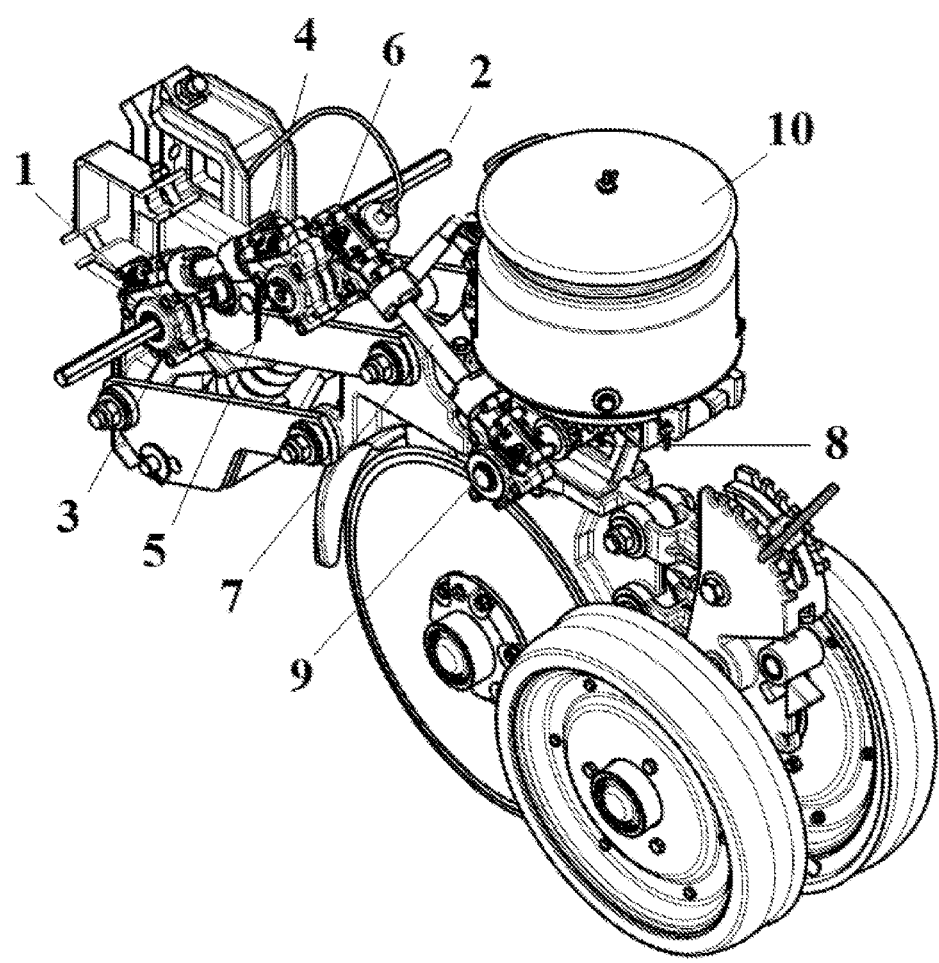
FIG. 1 illustrates the perspective view of a row planter, in the elevated position, incorporating the transmission system in accordance with the present invention.
Figure 2:
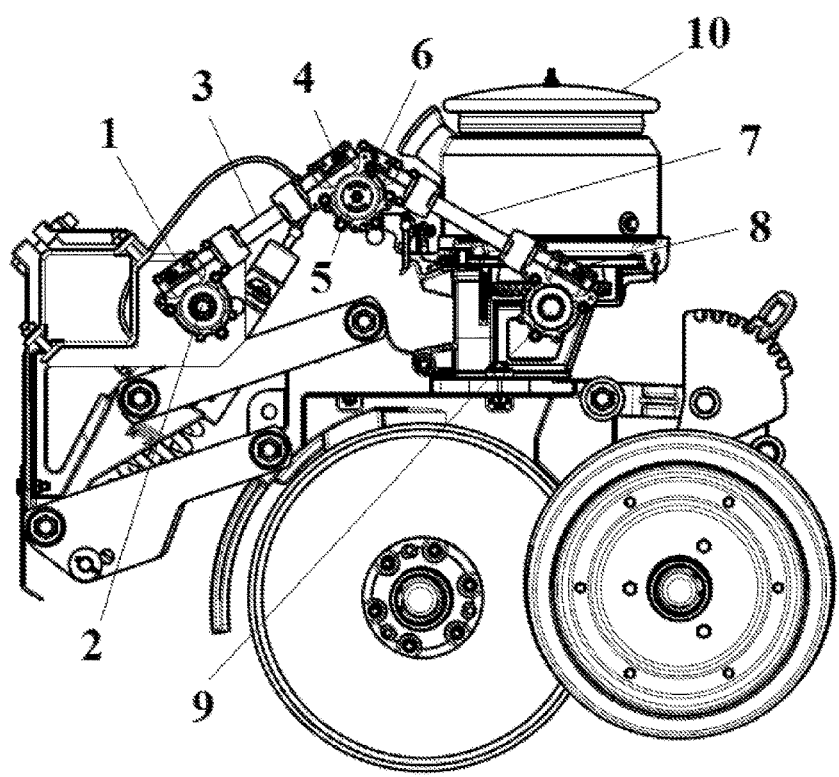
FIG. 2 illustrates the lateral view of a row planter, in the elevated position, incorporating the transmission system in accordance with the present invention.
Figure 3:
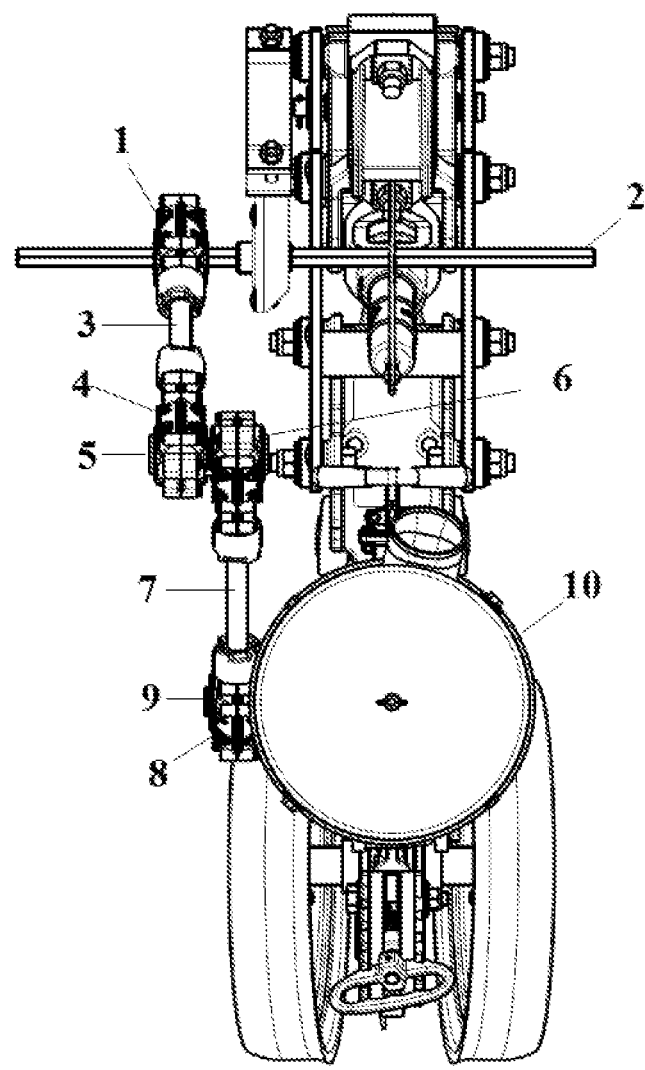
FIG. 3 illustrates the upper view of a row planter, in the elevated position, incorporating the transmission system in accordance with the present invention.
Figure 4:
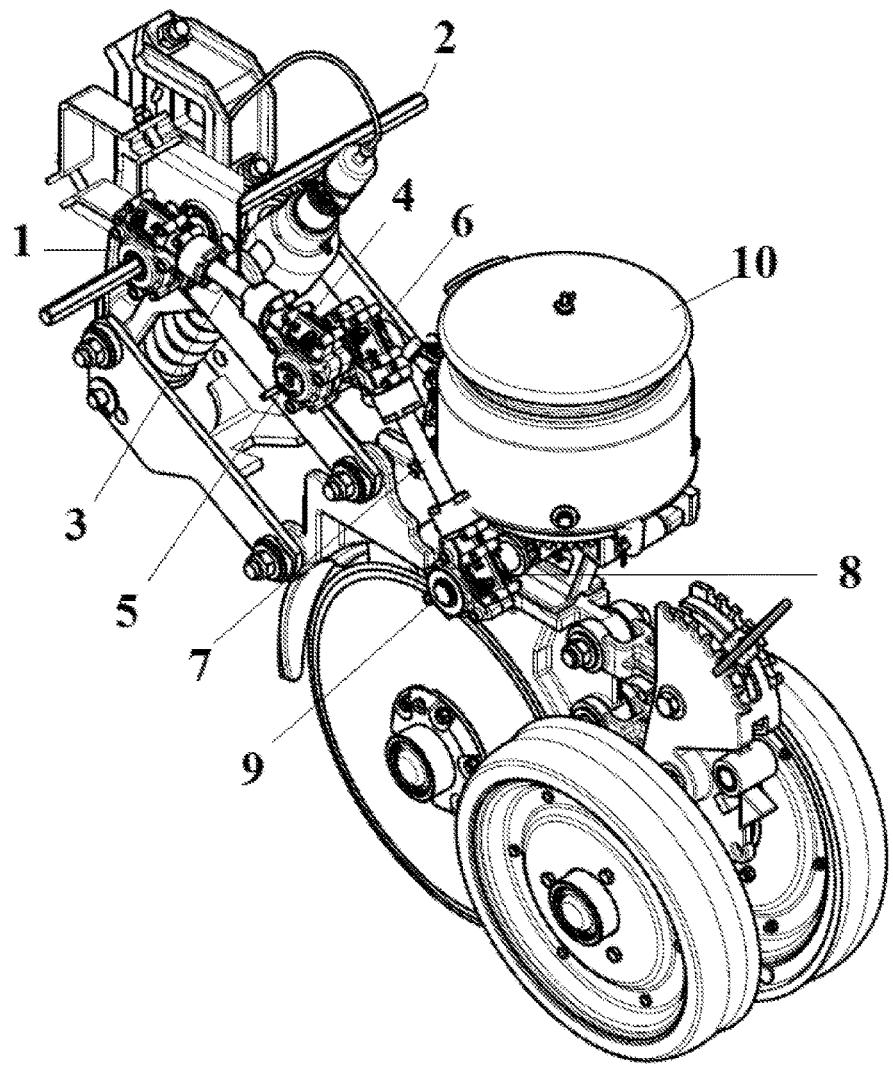
FIG. 4 illustrates the perspective view of a row planter, in the lowered position, incorporating the transmission system in accordance with the present invention.
Figure 5:
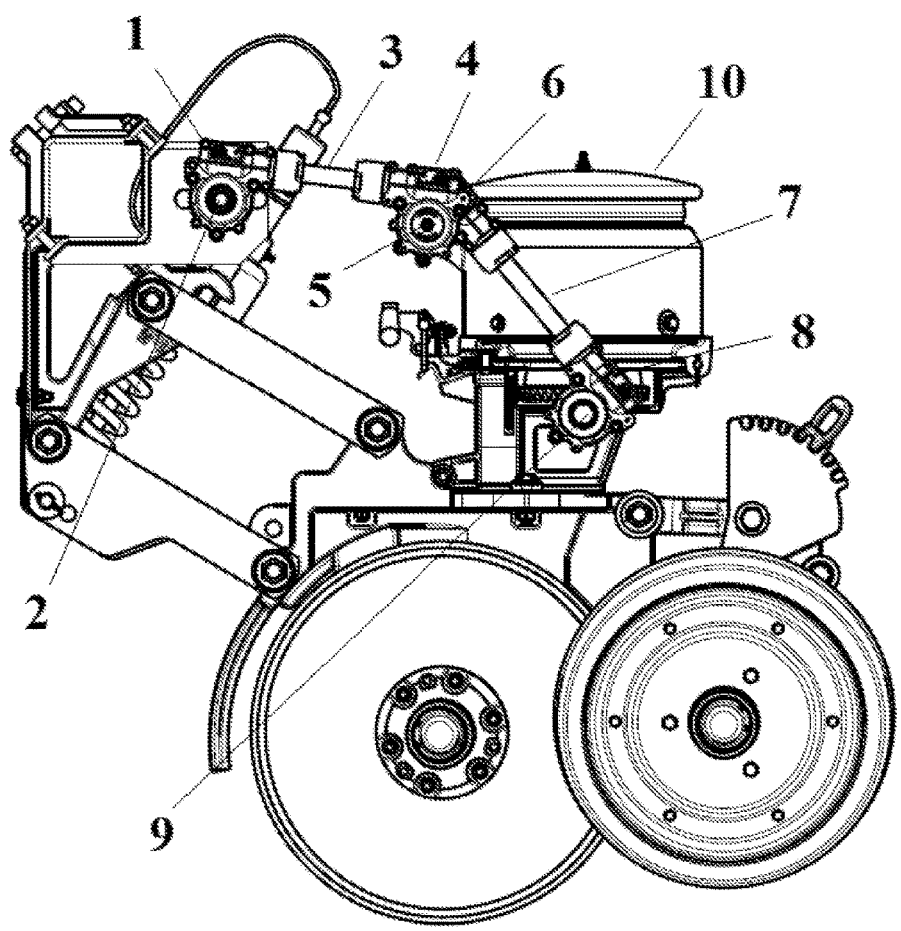
FIG. 5 illustrates the lateral view of a row planter, in the lowered position, incorporating the transmission system in accordance with the present invention.
Figure 6:
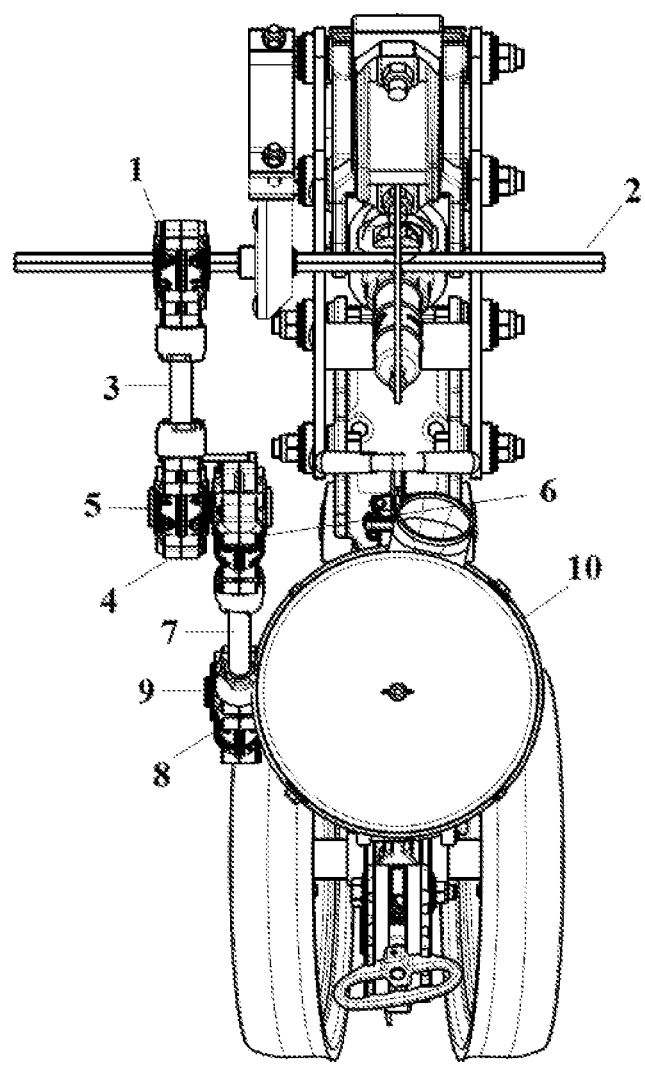
FIG. 6 illustrates the upper view of a row planter, in the lowered position, incorporating the transmission system in accordance with the present invention.

In accordance with the attached illustrated figures, the present flexible transmission system for application in agricultural machinery and implements in general uses a first transmission housing (1), which couples axially to the drive shaft (2) and tangentially to the first transmission cable (3), in whose opposite end is coupled a second transmission housing (4), which couples axially to the intermediate shaft (5), which also couples axially to a third transmission housing (6), which couples tangentially to the second transmission cable (7), in whose opposite end is coupled a fourth transmission housing (8), which couples axially to the shaft (9) of the dispenser (10).

The invention claimed is:

1. A flexible transmission system for application in agricultural machinery, the transmission system comprising:
   a first transmission housing, which couples axially to a drive shaft;
   wherein the drive shaft is coupled tangentially to an end of a first transmission cable, in whose opposite end is coupled to an intermediate shaft located in a second transmission housing,
   wherein the intermediate shaft also couples axially to a third transmission housing, which couples tangentially to one end of a second transmission cable, in whose opposite end is coupled a fourth transmission housing to rotatably drive a shaft of a dispenser.

* * * * *